United States Patent
Heger

(10) Patent No.: US 11,578,901 B2
(45) Date of Patent: Feb. 14, 2023

(54) COOLING FAN FOR REFRIGERANT COOLED MOTOR

(71) Applicant: TRANE INTERNATIONAL INC., Davidson, NC (US)

(72) Inventor: Joseph M. Heger, West Salem, WI (US)

(73) Assignee: TRANE INTERNATIONAL INC., Davidson, NC (US)

( * ) Notice: Subject to any disclaimer, the term of this patent is extended or adjusted under 35 U.S.C. 154(b) by 52 days.

(21) Appl. No.: 17/200,083

(22) Filed: Mar. 12, 2021

(65) Prior Publication Data

US 2021/0199356 A1 Jul. 1, 2021

Related U.S. Application Data

(63) Continuation of application No. 15/651,039, filed on Jul. 17, 2017, now abandoned.

(60) Provisional application No. 62/363,438, filed on Jul. 18, 2016.

(51) Int. Cl.

| *F25B 31/00* | (2006.01) |
|---|---|
| *H02K 9/06* | (2006.01) |
| *H02K 9/19* | (2006.01) |
| *H02K 9/10* | (2006.01) |
| *H02K 9/20* | (2006.01) |
| *H02K 9/00* | (2006.01) |
| *H02K 7/14* | (2006.01) |

(52) U.S. Cl.
CPC ............. *F25B 31/008* (2013.01); *H02K 9/10* (2013.01); *H02K 9/19* (2013.01); *H02K 9/20* (2013.01); *F25B 31/00* (2013.01); *F25B 2600/111* (2013.01); *H02K 7/14* (2013.01); *H02K 9/00* (2013.01)

(58) Field of Classification Search
CPC .. H02K 9/10; H02K 9/08; H02K 9/19; H02K 9/197; H02K 9/06; H02K 9/20; H02K 9/04; H02K 9/00; H02K 7/14; F25B 31/008; F25B 31/00; F25B 31/006; F25B 2600/111

See application file for complete search history.

(56) References Cited

U.S. PATENT DOCUMENTS

| 3,577,024 A | 5/1971 | Inagaki et al. |
|---|---|---|
| 3,675,056 A | 7/1972 | Lenz |
| 4,903,497 A | 2/1990 | Zimmern et al. |
| 5,350,039 A | 9/1994 | Voss et al. |
| 5,857,348 A | 1/1999 | Conry et al. |
| 5,924,847 A | 7/1999 | Scaringe et al. |
| 6,009,722 A | 1/2000 | Choi et al. |
| 6,070,421 A | 6/2000 | Petrovich et al. |

(Continued)

*Primary Examiner* — Edgardo San Martin
(74) *Attorney, Agent, or Firm* — Hamre, Schumann, Mueller & Larson, P.C.

(57) ABSTRACT

An electric motor for a vapor compression system is disclosed. The electric motor is provided with a working fluid. The electric motor includes a housing forming cavity therein. The housing includes a rotor, a stator, and a shaft. The rotor is secured to the shaft and the stator surrounds at least a portion of the rotor. An airgap is formed between the rotor and the stator. An inlet of the housing receives the working fluid and is in fluid communication with the airgap. An outlet of the housing is in fluid communication with the airgap and receives the working fluid from the airgap. The electric motor further includes an impeller that induces flow of the working fluid between the inlet and the outlet.

17 Claims, 5 Drawing Sheets

(56) References Cited

U.S. PATENT DOCUMENTS

| | | | |
|---|---|---|---|
| 6,155,802 A | 12/2000 | Choi et al. | |
| 6,570,276 B1 | 5/2003 | Morel et al. | |
| 6,997,686 B2 | 2/2006 | Agrawal et al. | |
| 7,181,928 B2 | 2/2007 | de Larminat | |
| 7,439,702 B2 | 10/2008 | Smith et al. | |
| 7,704,056 B2 | 4/2010 | Masoudipour et al. | |
| 7,758,320 B2 | 7/2010 | Pham et al. | |
| 8,021,127 B2 | 9/2011 | De Larminat | |
| 8,156,757 B2 | 4/2012 | Doty et al. | |
| 8,397,534 B2 | 3/2013 | Doty et al. | |
| 8,424,339 B2 | 4/2013 | Sommer | |
| 8,434,323 B2 | 5/2013 | Welch et al. | |
| 8,465,265 B2 | 6/2013 | De Larminat et al. | |
| 8,516,850 B2 | 8/2013 | Jadric et al. | |
| 8,523,540 B2 | 9/2013 | Eide et al. | |
| 8,959,950 B2 | 2/2015 | Doty et al. | |
| 9,074,604 B2 | 7/2015 | Konishi et al. | |
| 9,291,166 B2 | 3/2016 | De Larminat et al. | |
| 10,036,582 B2 | 7/2018 | Thornton et al. | |
| 2003/0094007 A1 | 5/2003 | Choi et al. | |
| 2010/0231066 A1 | 9/2010 | Körner | |
| 2013/0230382 A1 | 9/2013 | De Larminat et al. | |
| 2013/0302184 A1 | 11/2013 | Sishtla et al. | |
| 2018/0069455 A1 | 3/2018 | Engblom | |

COOLING FAN FOR REFRIGERANT COOLED MOTOR

FIELD

This disclosure relates generally to motor cooling in a vapor compression system. More specifically, this disclosure relates to motor cooling in a refrigerant cooled electric motor in a vapor compression system such as, but not limited to, a heating, ventilation, and air conditioning (HVAC) system.

BACKGROUND

An electric motor in a vapor compression system, such as a heating, ventilation, and air conditioning (HVAC) system, may operate at high rotational speeds, which can generate friction between various components of the electric motor and result in heat. The electric motor may be cooled using a working fluid of the vapor compression system (e.g., a heat transfer fluid such as a refrigerant).

SUMMARY

This disclosure relates generally to motor cooling in a vapor compression system. More specifically, this disclosure relates to motor cooling in a refrigerant cooled electric motor in a vapor compression system such as, but not limited to, a heating, ventilation, and air conditioning (HVAC) system.

In an embodiment, an electric motor for a vapor compression system includes a rotor, a stator, a shaft, and an impeller disposed within a housing. The impeller can be secured to the shaft, an end of the rotor, or another part of the rotor, according to an embodiment. In an embodiment, the rotor can additionally include one or more fins.

An electric motor for a vapor compression system is disclosed. The electric motor is provided with a working fluid. The electric motor includes a housing forming cavity therein. The housing includes a rotor, a stator, and a shaft. The rotor is secured to the shaft and the stator surrounds at least a portion of the rotor. An airgap is formed between the rotor and the stator. An inlet of the housing receives the working fluid and is in fluid communication with the airgap. An outlet of the housing is in fluid communication with the airgap and receives the working fluid from the airgap. The electric motor further includes an impeller that induces flow of the working fluid between the inlet and the outlet.

An electric motor that provides mechanical power to a compressor in a heating, ventilation, and air conditioning (HVAC) system is also disclosed. The electric motor includes a housing forming cavity therein. The housing includes a rotor, a stator, and a shaft. The rotor is secured to the shaft and the stator surrounds at least a portion of the rotor. An airgap is formed between the rotor and the stator. The shaft is coupled with the compressor. The housing also includes an inlet that receives the working fluid and is in fluid communication with the airgap; an outlet that is in fluid communication with the airgap and receives the working fluid from the airgap; and an impeller that induces flow of the working fluid between the inlet and the outlet.

A heating, ventilation, and air conditioning (HVAC) system is also disclosed. The HVAC system includes a compressor; and an electric motor coupled to the compressor. The electric motor provides a mechanical power to the compressor. The electric motor includes a housing forming cavity therein, the housing including: a rotor, a stator, and a shaft, the rotor being secured to the shaft and the stator surrounding at least a portion of the rotor, an airgap being formed between the rotor and the stator, the shaft being coupled with the compressor; an inlet that receives the working fluid and is in fluid communication with the airgap; an outlet that is in fluid communication with the airgap and receives the working fluid from the airgap; and an impeller that induces flow of the working fluid between the inlet and the outlet.

A method for cooling an electric motor in a vapor compression system is also disclosed. The electric motor includes a housing forming cavity therein, the housing including a rotor, a stator, and a shaft, wherein the rotor is secured to the shaft and the stator surrounds at least a portion of the rotor, an airgap being formed between the rotor and the stator. The method includes providing a working fluid to an inlet of the housing; cooling the electric motor by moving the working fluid from the inlet of the housing through the airgap, the working fluid receiving heat from the electric motor; and discharging the working fluid from an outlet of the housing.

BRIEF DESCRIPTION OF THE DRAWINGS

References are made to the accompanying drawings that form a part of this disclosure and which illustrate embodiments in which the systems and methods described in this specification can be practiced.

Like reference numbers represent like parts throughout.

DETAILED DESCRIPTION

Figure 1:
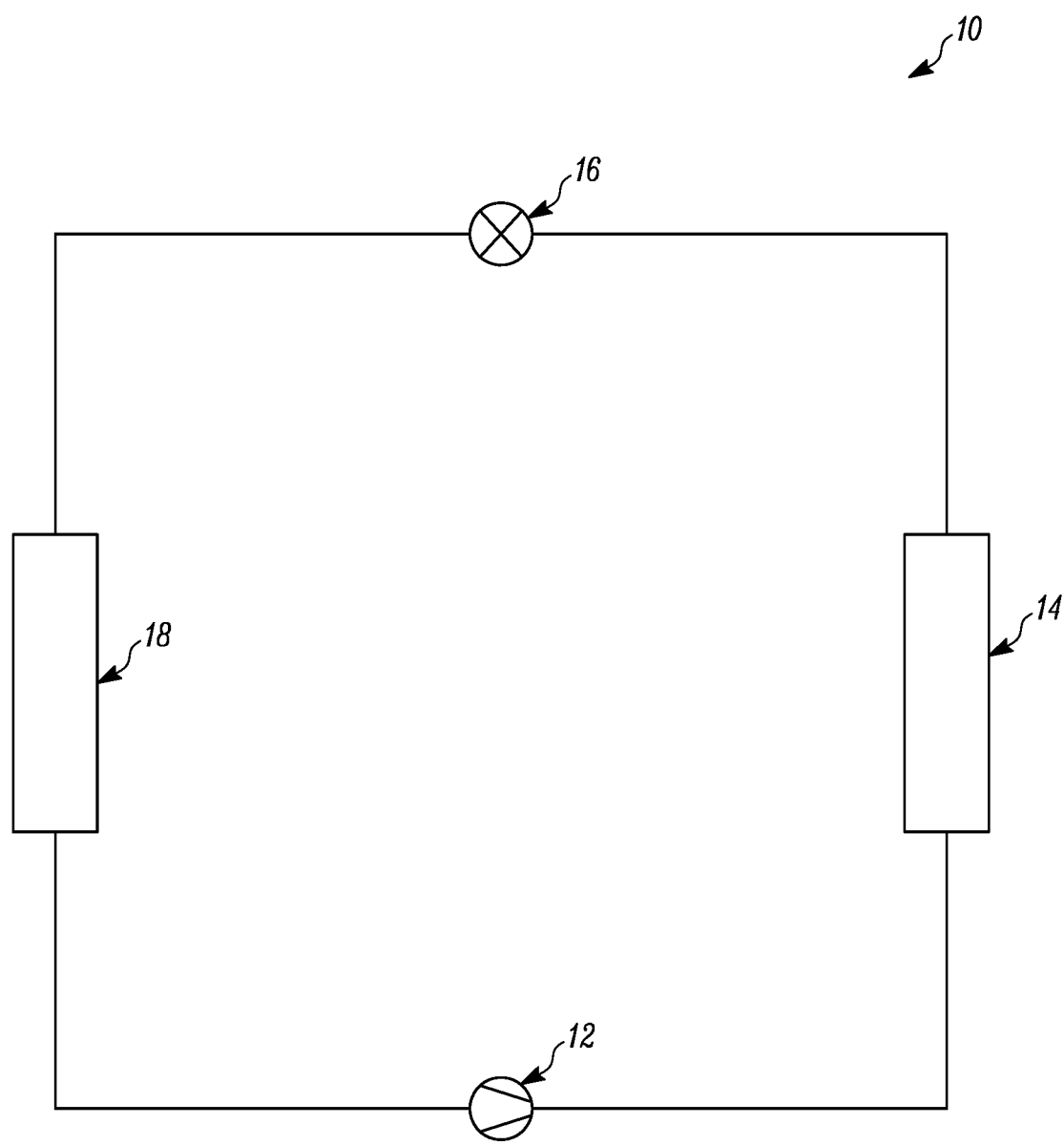
FIG. 1 is a schematic diagram of a heat transfer circuit, according to some embodiments.

This disclosure relates generally to motor cooling in a vapor compression system. More specifically, this disclosure relates to motor cooling in a refrigerant cooled electric motor in a vapor compression system such as, but not limited to, a heating, ventilation, and air conditioning (HVAC) system.

In a vapor compression system, a portion of a working fluid from the vapor compression system can be diverted to cool the electric motor. When the vapor compression system is, for example, included in an HVAC system, the working fluid (e.g., a heat transfer fluid such as a refrigerant or the like) can be provided to the electric motor to cool components of the electric motor (e.g., rotor, stator, etc.). When electric motors are cooled with the working fluid, a portion of the working fluid is provided to, for example, an airgap (e.g., a distance between the rotor and the stator) between the rotor and the stator to remove heat generated by a rotor and stator of the motor. In general, airgaps in electric motors are designed to be small in cross-sectional area. As a result, working fluid provided to the airgap generally is provided at a relatively high pressure to provide a sufficient amount of working fluid to achieve the desired cooling of the components of the electric motor. A common way to provide this relatively high pressure fluid is to create a restriction in the suction stream of the vapor compression system (e.g., a restriction of the working fluid being provided to the compressor) in which the electric motor is employed, draw a portion of the working fluid from an inlet of the restriction, provide the working fluid to the airgap, and provide the working fluid to an outlet side of the restriction. In an embodiment, the working fluid drawn from the suction stream and provided to the airgap can be from at or about 1 to at or about 2 percent of the suction flow (e.g., at or about 1 to at or about 2 percent of the working fluid provided from the restriction to the airgap and the remaining at or about 98 to at or about 99 percent of the working fluid provided from the restriction to the compressor) of working fluid.

Creating a restriction in the suction stream of a heat transfer circuit of the HVAC system can adversely affect an efficiency of, for example, the compressor in the heat transfer circuit. For example, by reducing a pressure of the heat transfer fluid, the heat transfer fluid is compressed from a lower suction pressure. Accordingly, the compressor works at a higher differential pressure, which increases an amount of power required by the compressor. In some cases, the suction mass flowrate is reduced and accordingly, an overall capacity of the vapor compression system is reduced. That is, the restriction can cause a reduction in capacity and an increase in power consumption, which leads to a reduction in compressor and system efficiency.

Embodiments of this disclosure are directed to providing an impeller in a housing of an electric motor to promote flow of a working fluid (e.g., a heat transfer fluid such as refrigerant) through the housing. In an embodiment, the impeller can provide the working fluid flowing through, for example, the airgap of the electric motor at a higher flowrate than is feasible by inducing a pressure drop in the suction stream.

FIG. 1 is a schematic diagram of a heat transfer circuit 10, according to an embodiment. The heat transfer circuit 10 generally includes a compressor 12, a condenser 14, an expansion device 16, and an evaporator 18. The compressor 12 is powered by an electric motor 20A, 20B, or 20C (shown and described in accordance with FIGS. 2-4 below). The heat transfer circuit 10 is exemplary and can be modified to include additional components. For example, in an embodiment the heat transfer circuit 10 can include an economizer heat exchanger, one or more flow control devices, a receiver tank, a dryer, a suction-liquid heat exchanger, or the like.

The heat transfer circuit 10 can generally be applied in a variety of systems (e.g., vapor compression systems) used to control an environmental condition (e.g., temperature, humidity, air quality, or the like) in a space (generally referred to as a conditioned space). Examples of systems include, but are not limited to, HVAC systems, transport refrigeration systems, or the like.

The components of the heat transfer circuit 10 are fluidly connected. The heat transfer circuit 10 can be specifically configured to be a cooling system (e.g., a fluid chiller of an HVAC system and/or an air conditioning system) capable of operating in a cooling mode. Alternatively, the heat transfer circuit 10 can be specifically configured to be a heat pump system which can operate in both a cooling mode and a heating/defrost mode.

Heat transfer circuit 10 operates according to generally known principles. The heat transfer circuit 10 can be configured to heat or cool a process fluid. In an embodiment, the process fluid can be, for example, a fluid such as, but not limited to, water or the like, in which case the heat transfer circuit 10 may be generally representative of a chiller system. In an embodiment, the process fluid can be, for example, a fluid such as, but not limited to, air or the like, in which case the heat transfer circuit 10 may be generally representative of an air conditioner or heat pump.

The compressor 12 can be, for example, a centrifugal compressor. In operation, the compressor 12 compresses the working fluid (e.g., heat transfer fluid such as refrigerant or the like) from a relatively lower pressure gas to a relatively higher-pressure gas. The relatively higher-pressure and higher temperature gas is discharged from the compressor 12 and flows through the condenser 14. In accordance with generally known principles, the working fluid flows through the condenser 10 and rejects heat to a process fluid (e.g., a heat transfer fluid or medium such as, but not limited to, water, air, etc.), thereby cooling the working fluid. The cooled working fluid, which is now in a liquid form, flows to the expansion device 16. The expansion device 16 reduces the pressure of the working fluid. As a result, a portion of the working fluid is converted to a gaseous form. The working fluid, which is now in a mixed liquid and gaseous form flows to the evaporator 18. The working fluid flows through the evaporator 18 and absorbs heat from the process fluid (e.g., heat transfer fluid or medium such as, but not limited to, water, air, etc.), heating the working fluid, and converting it to a gaseous form. The gaseous working fluid then returns to the compressor 12. The above-described process continues while the heat transfer circuit is operating, for example, in a cooling mode (e.g., while the compressor 12 is enabled).

Figure 2:
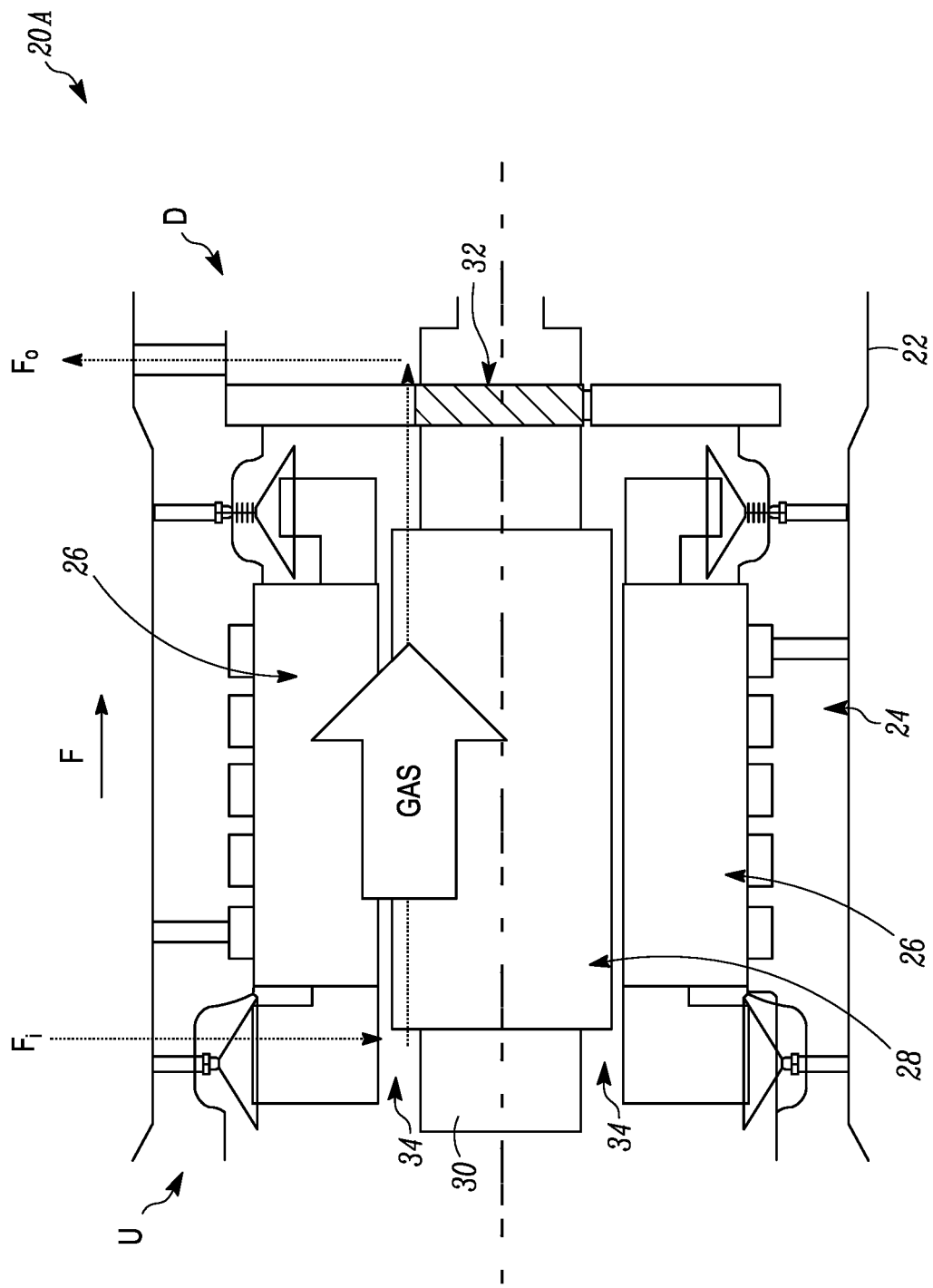
FIG. 2 is a side view of a portion of an electric motor for a vapor compression system, according to an embodiment.

FIG. 2 is a side view of a portion of an electric motor 20A for a vapor compression system (e.g., an electric motor for compressor 12 in the heat transfer circuit 10 of FIG. 1), according to an embodiment.

The electric motor 20A generally includes a housing 22 forming a cavity 24 therein. The housing 22 further includes a stator 26, a rotor 28, and a shaft 30. The rotor 28 is fixed to the shaft 30 and rotates the shaft 30, which is also connected to the compressor 12. An airgap 34 is formed between the stator 26 and the rotor 28.

The electric motor 20A can provide mechanical power to the compressor 12 via the shaft 30. The electric motor 20A can be provided with a portion of the working fluid (e.g., a heat transfer fluid such as refrigerant or the like) at a fluid inlet Fi which flows through the cavity 24, and particularly through the airgap 34 of the electric motor 20A, in a flow direction F (which is generally from left to right with respect to the figure), and exits from the cavity 24 via the fluid outlet Fo. In an embodiment, the working fluid can be in a gaseous form. It will be appreciated that a gaseous form of the working fluid may include a portion that is in liquid form, but the gaseous form includes a relatively higher portion of the working fluid in the gaseous form than the liquid form. In an embodiment, a location of the fluid inlet Fi can be varied. For example, in an embodiment, the fluid inlet Fi can be disposed at or about a center of the electric motor 20A.

An impeller 32 is included in the cavity 24. In the illustrated embodiment, the impeller 32 disposed on the shaft 30. In an embodiment, the impeller 32 can alternatively be disposed on the rotor 28. For example, the impeller 32 can be secured to an end or other part of the rotor 28. When disposed in such a location, the impeller 32 can rotate at a same frequency as the rotor 28 and the shaft 30. Because the impeller 32 is secured at such a location, the impeller 32 can rotate at any operating state of the compressor. That is, if the electric motor 20A is providing mechanical power to the compressor, the impeller 32 can move working fluid through the airgap 34. In an embodiment, the impeller 32 can provide a relatively greater amount of cooling as a speed of the electric motor 20A increases. In an embodiment, when the speed of the electric motor 20A is at a maximum speed, the impeller 32 can provide a relatively greatest amount of cooling. In an embodiment, the impeller 32 can be secured to the shaft 30 by, for example, welding or the like. In an embodiment, the shaft 30 and the impeller 32 can be a single piece, unitary construction.

In the illustrated embodiment, the impeller 32 is disposed on the shaft 30 on a downstream side D of the stator 26 and rotor 28. As a result, the impeller 32 can generally pull working fluid from the upstream side U of the stator 26 and rotor 28 toward the downstream side D of the stator 26 and rotor 28.

In an embodiment, the impeller 32 can be placed on the upstream side U of the stator 26 and rotor 28. In such an embodiment, the impeller 32 may generally push the working fluid from the upstream side U toward the downstream side D.

In an embodiment, the shaft 30 can include a plurality of impellers 32. In such an embodiment, one of the plurality of impellers can be disposed on the upstream side U and another of the plurality of impellers can be disposed on the downstream side D.

The design of the impeller 32 can be varied. In an embodiment, the impeller 32 can be designed for a particular compressor application (e.g., a particular capacity, etc.). In an embodiment, the impeller 32 can be designed to provide a selected mass flow through the cavity 24. In an embodiment, the impeller 32 can be designed to provide a selected lift. For example, in an embodiment, the impeller 32 can be designed to provide a mass flowrate of working fluid through the airgap 34 equivalent to at or about 1 to at or about 2 percent of the compressor suction mass flow. In an embodiment, the impeller 32 can be designed to provide a mass flowrate of working fluid through the airgap 34 can approach at or about 100 percent of the compressor suction mass flow. This can occur, for example, when the electric motor 20A is operating at a low load and a high speed. It will be appreciated that the particular mass flowrate is intended to be an example and that the actual values can vary beyond the stated range. For example, if additional cooling of the electric motor 20A is desired, the impeller 32 can be designed to provide a higher mass flowrate than the at or about 2 percent of the compressor suction mass flow.

In an embodiment, the impeller 32 can be designed to minimize the compressor lift (e.g., difference between condenser working fluid pressure and evaporator working fluid pressure).

Figure 3:
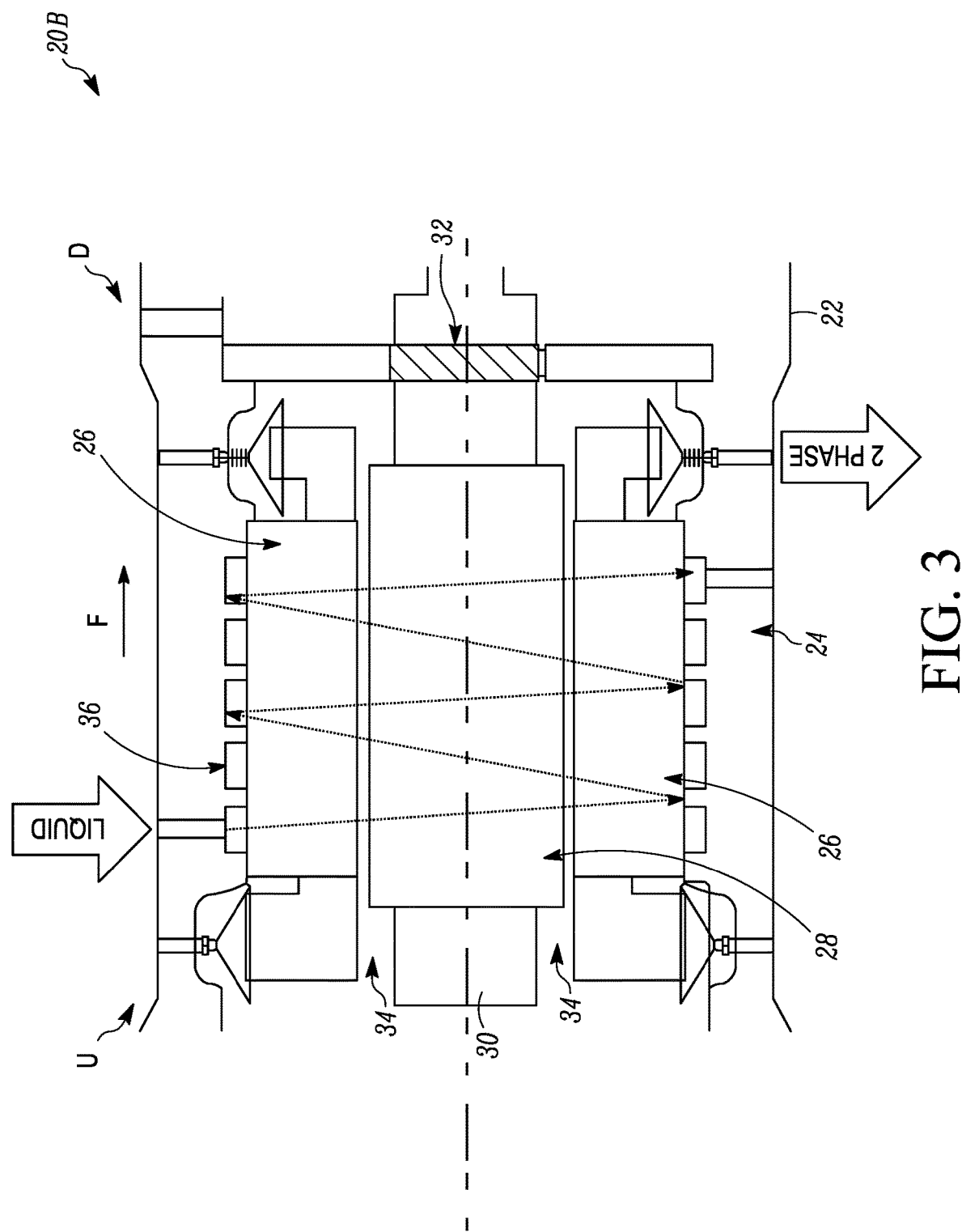
FIG. 3 is a side view of a portion of an electric motor for a vapor compression system, according to an embodiment.

In an embodiment, the impeller 32 can provide an increased efficiency of the vapor compression system. For example, a capacity of the compressor is generally not reduced because the impeller 32 does not necessitate a pressure drop in the suction stream. In an embodiment, because the impeller 32 can be designed to provide a desired amount of motor cooling, the impeller 32 can provide additional cooling to the electric motor 20A FIG. 3 is a side view of a portion of the electric motor 20B, according to an embodiment. Aspects of FIG. 3 which have been described above with respect to FIG. 2 will not be described in additional detail.

In FIG. 3, the electric motor 20B includes additional cooling in a form of a "liquid jacket" that surrounds the components (e.g., the stator 26 and the rotor 28) of the electric motor 20B. The electric motor 20B of FIG. 3 is additionally provided with a flow passage 36 which surrounds the stator 26 and rotor 28 of the electric motor 20B. The working fluid is provided to the flow passage 36. The working fluid is generally provided in a liquid phase. Heat generated by the stator 26 and the rotor 28 is rejected to the working fluid, which exits the housing 22 as a two-phase fluid (e.g., mixture of gaseous and liquid heat transfer fluid). In an embodiment, the working fluid can be provided to the flow passage 36 from any component which can provide the working fluid as a two-phase fluid (e.g., the condenser 14 (FIG. 1)) and can be provided to another component of the system (e.g., an evaporator, an economizer heat exchanger, etc.).

Figure 4:
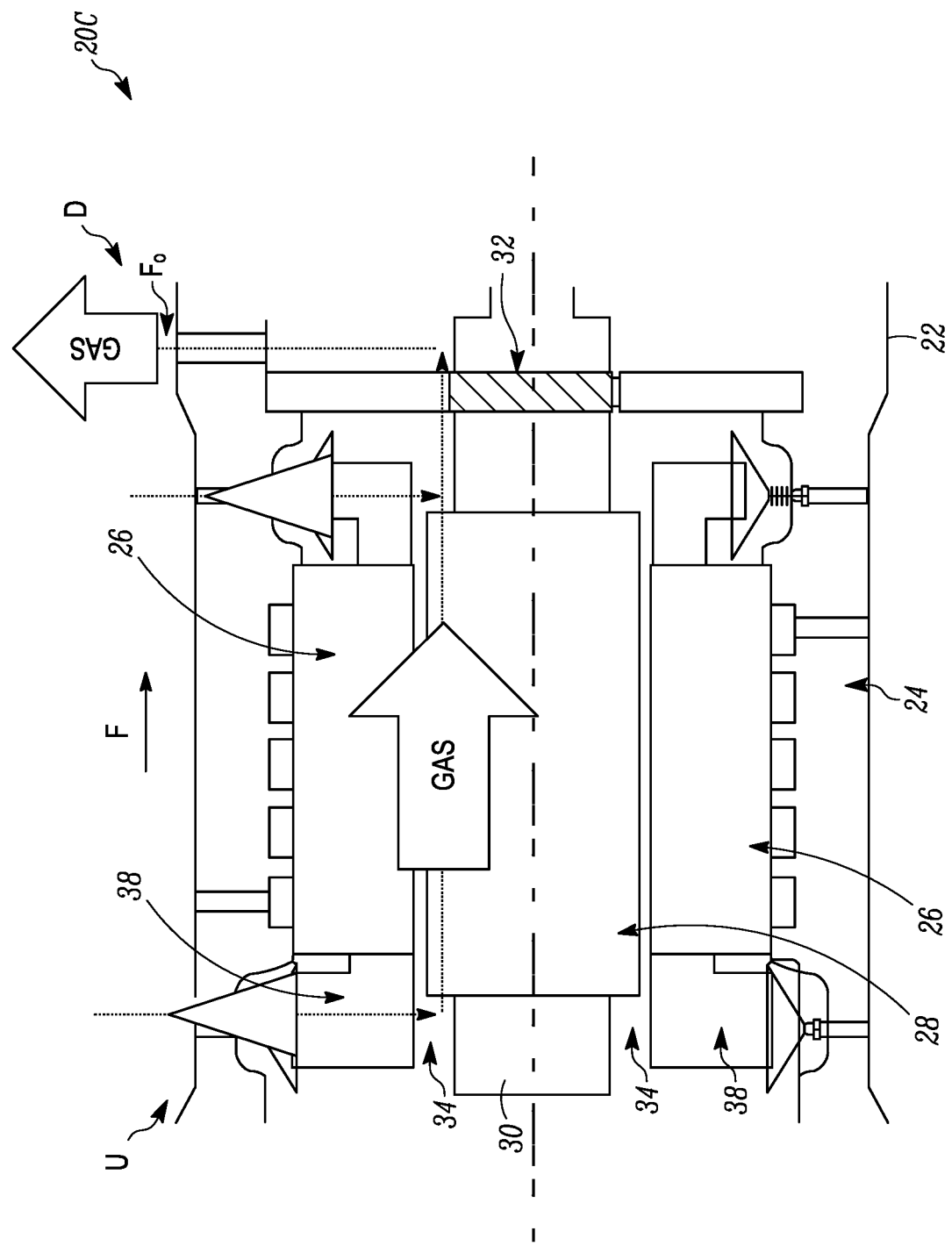
FIG. 4 is a side view of a portion of an electric motor for a vapor compression system, according to an embodiment.

FIG. 4 is a side view of a portion of the motor 20C, according to an embodiment. Aspects of FIG. 4 which have been described above with respect to FIGS. 2-3 will not be described in additional detail.

In FIG. 4, the electric motor 20C includes additional cooling in a form of an insertion of additional working fluid. The insertion can be provided to a location at or about windings 38 of the stator 26. In an embodiment, the insertion can be provided on the upstream side U. In an embodiment, the insertion can be provided on the downstream side D. In an embodiment, the insertion can be provided on both the upstream side U and the downstream side D. The insertion, in an embodiment, can be in a form of a spray from a nozzle. The working fluid provided can generally be in a liquid form, which when receiving heat from the stator 26 and the rotor 28 is heated to be in gaseous form. The gaseous working fluid can be removed from the housing 22 via the fluid outlet Fo, similar to the flow in the electric motor 20A of FIG. 2.

It will be appreciated that the electric motors 20A (FIG. 2), 20B (FIG. 3), and 20C (FIG. 4) include features which are illustrated individually for simplicity of this specification, but the features of these embodiments can be combined to provide cooling to electric motors.

Figure 5:
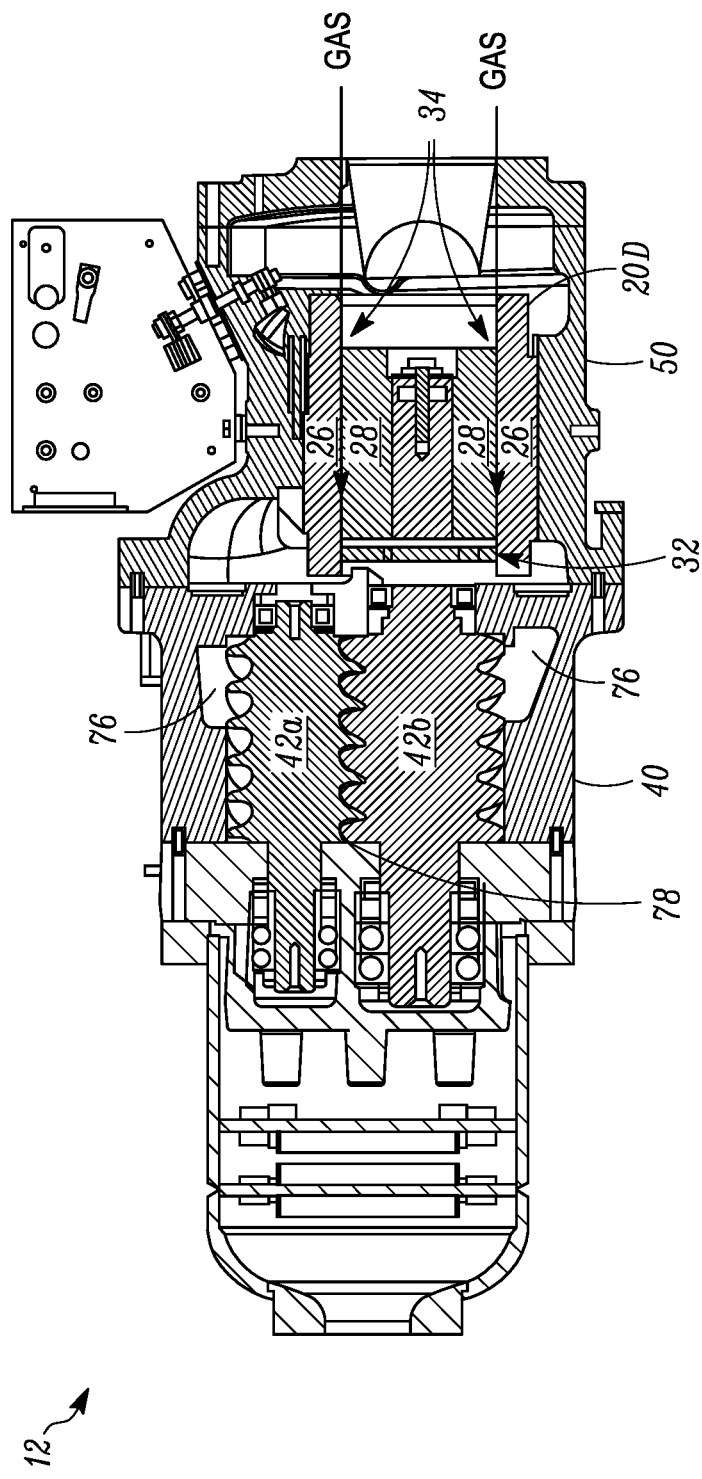
FIG. 5 is a side view of a compressor including an electric motor for a vapor compression system, according to an embodiment.

FIG. 5 is a side view of a compressor including an electric motor 20D for a vapor compression system (e.g., an electric motor for compressor 12 in the heat transfer circuit 10 of FIG. 1), according to an embodiment. FIG. 5 generally illustrates the electric motor 20D as included in the compressor 12. In the illustrated embodiment, the compressor 12 is representative of a screw compressor. Aspects of the electric motor 20D may be the same as or similar to aspects of the electric motors 20A-20C described above.

The screw compressor 12 includes a rotor housing 40 and an electric motor housing 50. The rotor housing 40 includes a suction port 76 and a discharge port 78. Rotors 42a, 42b are intermeshed and are disposed at least partially within the rotor housing 40. The screw compressor 12 can operate in accordance with generally known principles to compress a working fluid received via the suction port 76 and to be output via the discharge port 78.

The motor housing 50 houses a motor 20D, according to an embodiment. The motor housing 50 may be integral to the rotor housing 40. The electric motor 20D can drive the intermeshed rotors 42a, 42b. Disposed within the motor housing 50 may be an impeller 32. The impeller 32 is illustrated as being disposed on an end of the electric motor 20D that is relatively closer to the rotors 42a, 42b. It will be appreciated that the impeller 32 may be disposed on an end of the electric motor 20D that is relatively away from the rotors 42a, 42b (an opposite end from what is shown in FIG. 5).

In the embodiment illustrated in FIG. 5, the electric motor 20D can be provided with a portion of the working fluid (e.g., a heat transfer fluid such as refrigerant or the like) which flows through the airgap 34 of the electric motor 20D, in a flow direction which is generally from right to left with respect to the figure, and is provided to the suction port 76.

In an embodiment, the working fluid can be in a gaseous form. It will be appreciated that a gaseous form of the working fluid may include a portion that is in liquid form, but the gaseous form includes a relatively higher portion of the working fluid in the gaseous form than the liquid form.

Aspects:

It is to be appreciated that any of aspects 1-11 can be combined with any one of aspects 12-22, 23-24, and 25-29. Any one of aspects 12-22 can be combined with any one of aspects 23-24 and 25-29. Any one of aspects 23-24 can be combined with any one of aspects 25-29.

Aspect 1. An electric motor for a vapor compression system, the electric motor being provided with a working fluid, the electric motor comprising:
  a housing forming cavity therein, the housing including:
  a rotor, a stator, and a shaft, wherein the rotor is secured to the shaft and the stator surrounds at least a portion of the rotor;
  an airgap formed between the rotor and the stator;
  an inlet that receives the working fluid and is in fluid communication with the airgap;
  an outlet that is in fluid communication with the airgap and receives the working fluid from the airgap; and
  an impeller that induces flow of the working fluid between the inlet and the outlet.

Aspect 2. The electric motor according to aspect 1, wherein the impeller is disposed on an upstream side of the rotor and the stator.

Aspect 3. The electric motor according to aspect 2, wherein the impeller is configured to push the working fluid from the inlet to the outlet.

Aspect 4. The electric motor according to aspect 1, wherein the impeller is disposed on a downstream side of the rotor and the stator.

Aspect 5. The electric motor according to aspect 4, wherein the impeller is configured to pull the working fluid from the inlet to the outlet.

Aspect 6. The electric motor according to aspect 1, further comprising a second impeller, wherein the impeller is disposed on the upstream side of the rotor and the stator.

Aspect 7. The electric motor according to aspect 6, wherein the second impeller is disposed on the downstream side of the rotor and the stator.

Aspect 8. The electric motor according to any one of aspects 1-7, wherein the impeller is disposed on the shaft.

Aspect 9. The electric motor according to any one of aspects 1-7, wherein the impeller is disposed on the rotor.

Aspect 10. The electric motor according to any one of aspects 1-9, further comprising a flow passage surrounding the rotor and the stator.

Aspect 11. The electric motor according to any one of aspects 1-10, further comprising a spray nozzle disposed near windings of the stator.

Aspect 12. An electric motor that provides mechanical power to a compressor in a heating, ventilation, and air conditioning (HVAC) system, the electric motor comprising:
  a housing forming cavity therein, the housing including:
  a rotor, a stator, and a shaft, wherein the rotor is secured to the shaft and the stator surrounds at least a portion of the rotor, an airgap being formed between the rotor and the stator, the shaft being coupled with the compressor;
  an inlet that receives the working fluid and is in fluid communication with the airgap;
  an outlet that is in fluid communication with the airgap and receives the working fluid from the airgap; and
  an impeller that induces flow of the working fluid between the inlet and the outlet.

Aspect 13. The electric motor according to aspect 12, wherein the impeller is disposed on an upstream side of the rotor and the stator.

Aspect 14. The electric motor according to aspect 13, wherein the impeller is configured to push the working fluid from the inlet to the outlet.

Aspect 15. The electric motor according to aspect 12, wherein the impeller is disposed on a downstream side of the rotor and the stator.

Aspect 16. The electric motor according to aspect 15, wherein the impeller is configured to pull the working fluid from the inlet to the outlet.

Aspect 17. The electric motor according to aspect 12, further comprising a second impeller, wherein the impeller is disposed on the upstream side of the rotor and the stator.

Aspect 18. The electric motor according to aspect 17, wherein the second impeller is disposed on the downstream side of the rotor and the stator.

Aspect 19. The electric motor according to any one of aspects 12-18, wherein the impeller is disposed on the shaft.

Aspect 20. The electric motor according to any one of aspects 12-18, wherein the impeller is disposed on the rotor.

Aspect 21. The electric motor according to any one of aspects 12-20, further comprising a flow passage surrounding the rotor and the stator.

Aspect 22. The electric motor according to any one of aspects 12-21, further comprising a spray nozzle disposed near windings of the stator.

Aspect 23. A heating, ventilation, and air conditioning (HVAC) system, comprising:
  a compressor; and
  an electric motor coupled to the compressor, wherein the electric motor provides a mechanical power to the compressor, the electric motor including:
  a housing forming cavity therein, the housing including:
  a rotor, a stator, and a shaft, wherein the rotor is secured to the shaft and the stator surrounds at least a portion of the rotor, an airgap being formed between the rotor and the stator, the shaft being coupled with the compressor;
  an inlet that receives the working fluid and is in fluid communication with the airgap;
  an outlet that is in fluid communication with the airgap and receives the working fluid from the airgap; and
  an impeller that induces flow of the working fluid between the inlet and the outlet.

Aspect 24. The HVAC system according to aspect 23, further comprising a condenser, an evaporator, and an expansion device.

Aspect 25. A method for cooling an electric motor in a vapor compression system, the electric motor including a housing forming cavity therein, the housing including a rotor, a stator, and a shaft, wherein the rotor is secured to the shaft and the stator surrounds at least a portion of the rotor, an airgap being formed between the rotor and the stator, the method comprising:
  providing a working fluid to an inlet of the housing;
  cooling the electric motor by moving the working fluid from the inlet of the housing through the airgap, the working fluid receiving heat from the electric motor; and
  discharging the working fluid from an outlet of the housing.

Aspect 26. The method according to aspect 25, wherein moving the working fluid from the inlet of the housing through the airgap includes pulling the working fluid from the inlet toward the outlet with an impeller disposed on the shaft, the impeller being on a downstream side of the rotor and the stator.

Aspect 27. The method according to any one of aspects 25-26, wherein moving the working fluid from the inlet of the housing through the airgap includes pushing the working fluid from the inlet toward the outlet with an impeller disposed on the shaft, the impeller being on an upstream side of the rotor and the stator.

Aspect 28. The method according to any one of aspects 25-27, wherein the working fluid is moved through the airgap at a desired mass flowrate.

Aspect 29. The method according to aspect 28, wherein the desired mass flowrate is from at or about 1 to at or about 2 percent of a mass flow of the compressor in the vapor compression system.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, indicate the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts, without departing from the scope of the present disclosure. The word "embodiment" as used within this specification may, but does not necessarily, refer to the same embodiment. This specification and the embodiments described are examples only. Other and further embodiments may be devised without departing from the basic scope thereof, with the true scope and spirit of the disclosure being indicated by the claims that follow.

What is claimed is:

1. A heating, ventilation, and air conditioning (HVAC) system, comprising:
    a compressor to compress a working fluid, the compressor comprising:
        a housing,
        a suction port at an entry portion of the housing, and
        a discharge port at an outlet portion of the housing; and
    an electric motor to provide a mechanical power to the compressor, the electric motor including:
        a motor housing different from the housing of the compressor,
        a rotor,
        a stator, and
        a shaft,
        wherein the rotor is secured to the shaft and the stator surrounds at least a portion of the rotor, an airgap to solely cool the electric motor and being formed between the rotor and the stator, the shaft being coupled with the compressor,
        the motor housing having:
            an inlet to receive a portion of the working fluid from a restriction in a suction stream of the working fluid provided to the compressor and is in fluid communication with the airgap to solely cool the electric motor;
            an outlet to receive the portion of working fluid from the airgap to solely cool the electric motor; and
            a cavity having an impeller disposed therein to induce a flow of the portion of the working fluid between the inlet and the outlet of the motor housing to solely cool the electric motor within the motor housing, separate from the compressor compressing the working fluid.

2. The HVAC system according to claim 1, further comprising a condenser, an evaporator, and an expansion device.

3. The HVAC system according to claim 1, wherein the impeller induces the flow by pushing the portion of the working fluid from the inlet to the outlet.

4. The HVAC system according to claim 1, wherein the impeller induces the flow by pulling the portion of the working fluid from the inlet to the outlet.

5. The HVAC system according to claim 1, wherein the impeller is disposed on the shaft, and the shaft extends from within the motor housing into the separate and different compressor housing.

6. The HVAC system according to claim 1, wherein the electric motor further comprises a spray nozzle disposed near windings of the stator.

7. The HVAC system according to claim 1, further comprising a second impeller is disposed on an upstream side of the rotor and the stator.

8. The HVAC system according to claim 1, further comprising a second impeller disposed on a downstream side of the rotor and the stator.

9. The HVAC system according to claim 1, wherein the impeller is to solely move the portion of the working fluid through the airgap.

10. A method for cooling an electric motor in a vapor compression system, the system comprising:
    a compressor, including:
        a housing,
        a suction port at an entry portion of the housing, and
        a discharge port at an outlet portion of the housing;
    the electric motor including:
        a motor housing different from the housing of the compressor,
        a rotor,
        a stator, and
        a shaft,
        wherein the rotor is secured to the shaft and the stator surrounds at least a portion of the rotor, an airgap formed between the rotor and the stator, the method comprising:
            compressing a working fluid in the housing of the compressor;
            providing working fluid to an inlet of the motor housing from a restriction in a suction stream of the working fluid provided to the compressor;
            cooling the electric motor by an impeller that is disposed in a cavity within the motor housing by moving a portion of the working fluid from the inlet of the motor housing through the airgap to solely cool the electric motor, the cooling being within the motor housing separate from the compressing of the working fluid in the housing of the compressor, the working fluid from the inlet receiving heat from the electric motor; and
            discharging the working fluid from the inlet out of an outlet of the motor housing.

11. The method according to claim 10, wherein the impeller pulls the working fluid from the inlet toward the outlet of the motor housing.

12. The method according to claim 10, wherein the impeller pushes the working fluid from the inlet toward the outlet of the motor housing.

13. The method according to claim 10, wherein the working fluid from the inlet is induced through the airgap solely to cool the electric motor at a desired mass flowrate.

14. The method according to claim 13, wherein the desired mass flowrate is from at or about 1 to at or about 2 percent of a mass flow of the compressor in the vapor compression system.

15. The method according to claim 10, wherein the impeller is to solely move the working fluid from the inlet through the airgap.

16. The method according to claim 10, further comprising a second impeller disposed on an upstream side of the rotor and the stator.

17. The method according to claim 10, wherein the impeller is disposed on a downstream side of the rotor and the stator.

* * * * *